Patented Dec. 2, 1930

1,783,647

UNITED STATES PATENT OFFICE

FRIEDRICH AUGUST HENGLEIN, OF COLOGNE-DEUTZ, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF METALLIC NITRATES

No Drawing. Application filed November 28, 1927, Serial No. 236,379, and in Germany December 8, 1926.

The present invention concerns the manufacture of metallic nitrates and consists in causing oxygen or gases containing oxygen such as air to react upon metallic nitrites in aqueous solution or in the presence of water at a pressure exceeding 1 atmosphere and at a temperature exceeding 150° C. in the presence or absence of alkali metal hydroxides.

The metallic nitrites serving as the starting material are obtainable, for example by the action of nitrous gases upon the corresponding metallic oxides or carbonates.

The following examples will illustrate my invention:

*Example 1.*—100 grams of potassium nitrite in aqueous solution (300 ccm.) are subjected to the action of oxygen gas in a nickel autoclave at a temperature of 160° C. and at a pressure of 15 atmospheres with vigorous stirring. After 2 hours the conversion to potassium nitrate is complete.

*Example 2.*—A mixture of 50 grams of potassium nitrate and 20 grams of potassium nitrite in aqueous solution (300 ccm.) is subjected in an autoclave to the action of oxygen gas at a pressure of 14 atmospheres at 160° C. with vigorous stirring. The conversion of the nitrite is complete after 2 hours.

*Example 3.*—A mixture of 100 grams of potassium nitrite and 20 grams caustic potash dissolved in 1000 ccm. of water is subjected to the action of oxygen gas in a nickel autoclave at a temperature of 160° C. and under a pressure of 15 atmospheres with vigorous stirring. The conversion to potassium nitrate is complete after 2 hours.

*Example 4.*—A mixture of 40 grams of zinc nitrite and 100 grams of zinc nitrate is dissolved in 500 ccm. of water and subjected to the action of oxygen gas at a pressure of 20 atmospheres and at a temperature of 170° C. with vigorous stirring. The conversion of the nitrite to nitrate is quantitative.

In the following claims the term "oxygen" is intended to comprise oxygen-containing gases such as air.

I claim:

1. In the process of producing metallic nitrates the step which comprises causing oxygen to react upon metallic nitrites in the presence of water at a pressure exceeding one atmosphere and at a temperature exceeding 150° C. in the presence of an alkali metal hydroxide.

2. In the process of producing metallic nitrates the step which comprises causing oxygen to react upon metallic nitrites in aqueous solution at a pressure exceeding one atmosphere and at a temperature exceeding 150° C. in the presence of an alkali metal hydroxide.

3. In the process of producing potassium nitrate the step which comprises causing oxygen to react upon potassium nitrite in the presence of water at a pressure exceeding one atmosphere and at a temperature exceeding 150° C. in the presence of an alkali metal hydroxide.

4. In the process of producing potassium nitrate the step which comprises causing oxygen to react upon potassium nitrite in the presence of water at a pressure exceeding one atmosphere and at a temperature exceeding 150° C. in the presence of caustic potash.

5. In the process of producing potassium nitrate the step which comprises causing oxygen to react upon potassium nitrite in aqueous solution at a pressure exceeding one atmosphere and at a temperature exceeding 150° C. in the presence of caustic potash.

6. In the process of producing potassium nitrate the step which comprises causing oxygen to react upon potassium nitrite in aqueous solution at a pressure of 15 atmospheres and at a temperature of 160° C. in the presence of caustic potash.

In testimony whereof I have hereunto set my hand.

FRIEDRICH AUGUST HENGLEIN.